(12) United States Patent
Hu (10) Patent No.: US 11,891,897 B1
(45) Date of Patent: Feb. 6, 2024

(54) INTEGRATED MANUFACTURING SYSTEM AND METHOD FOR SMALL-DEFORMATION SELF-DIAGNOSIS SHIELD SEGMENT

(71) Applicant: CNBM Technology Innovation Academy (Shandong) Co., Ltd., Zaozhuang (CN)

(72) Inventor: Zhongchun Hu, Zaozhuang (CN)

(73) Assignee: CNBM Technology Innovation Academy (Shandong) Co., Ltd., Zaozhuang (CN)

( * ) Notice: Subject to any disclaimer, the term of this patent is extended or adjusted under 35 U.S.C. 154(b) by 0 days.

(21) Appl. No.: 18/361,865

(22) Filed: Jul. 30, 2023

(30) Foreign Application Priority Data

Dec. 2, 2022 (CN) .......................... 202211537202.0

(51) Int. Cl.
*E21D 11/00* (2006.01)
*E21F 17/18* (2006.01)

(52) U.S. Cl.
CPC .......... *E21D 11/003* (2013.01); *E21F 17/185* (2013.01)

(58) Field of Classification Search
CPC .............................. E21D 11/003; E21F 17/185
See application file for complete search history.

(56) References Cited

U.S. PATENT DOCUMENTS

| | | | | |
|---|---|---|---|---|
| 4,581,712 | A * | 4/1986 | Perry ..................... | E21F 17/185 299/1.05 |
| 7,542,856 | B2 * | 6/2009 | Kishida ................ | G01M 11/085 702/35 |
| 2008/0041377 | A1* | 2/2008 | Turiello .................. | E21F 11/00 128/204.22 |
| 2014/0320298 | A1* | 10/2014 | Meiksin .............. | G01M 5/0041 340/683 |
| 2018/0089852 | A1* | 3/2018 | Baker ..................... | G06T 7/246 |

FOREIGN PATENT DOCUMENTS

| | | |
|---|---|---|
| CN | 103123252 A | 5/2013 |
| CN | 108590677 A | 9/2018 |
| CN | 112964166 A | 6/2021 |

* cited by examiner

*Primary Examiner* — Albert K Wong
(74) *Attorney, Agent, or Firm* — Nitin Kaushik (57) ABSTRACT

The invention discloses an integrated manufacturing system and method for a small-deformation self-diagnosis shield segment, wherein the designed installation process saves time and effort, and all the sensing modules are provided inside the segment without disturbing the space outside the segment. Integration of all the deformation self-diagnosis shield segments is achieved by comprehensively monitoring inclination, displacement, strain, pressure and temperature of the shield segments via five monitoring modules. At the same time, the obtained data is uploaded to a database, and various contents are displayed in real time according to indication information input by a user.

9 Claims, 7 Drawing Sheets

INTEGRATED MANUFACTURING SYSTEM AND METHOD FOR SMALL-DEFORMATION SELF-DIAGNOSIS SHIELD SEGMENT

CROSS-REFERENCE TO RELATED APPLICATIONS

The application claims priority to Chinese patent application No. 2022115372020, filed on Dec. 2, 2022, the entire contents of which are incorporated herein by reference.

TECHNICAL FIELD

The present invention is in the technical field of tunnel engineering, in particular to an integrated manufacturing system and method for a small-deformation self-diagnosis shield segment.

BACKGROUND

Prefabricated shield segment assembly has been widely used with an increasing demand of more and more underwater shield tunnel construction. However, the assembled shield segments are prone to the accidents of uneven stress, floating of the tunnel and excessive water gushing of cracks among segments, so it is necessary to monitor and diagnose the deformation of the tunnel, such as the inner inclination, displacement, strain and water and concrete pressure. Fiber Bragg Grating (FBG) sensor has the advantages of high precision measurement and distributed detection, which can accurately measure the above-mentioned deformation, but it is easy to damage the sensor due to the construction, which affects the normal operation of the sensor. Therefore, when installing a sensor, it is necessary to manufacture a shield segment in view of the above problems.

However, the production process of the existing shield segments requires a lot of manpower, material resources, financial resources and time, and the accuracy of the shield segments produced are easily affected by human factors, and the self-diagnosis error is serious.

Through the above analysis, the problems and defects of the prior art are:

1. Vulnerability of Sensor

Most of the existing sensors are installed on the surface of shield segments, and during the transportation, assembly, grouting and secondary pouring of shield segments, it is easy to cause the damage of sensors and transmission optical cables, which makes it difficult to collect sensor data;

2. Tight Installation Time, Inflexibility

Most of the existing sensors need to be installed on a shield machine after the shield segments are assembled, and the installation time is limited by the running state of the shield machine; once the shield machine passes through the working face, it cannot be installed in a short time and the installation time is limited and tight;

3. Poor Working Environment

The surface-mounted sensor needs to be installed on the shield machine, or after the shield machine has been opened, the lifting platform is used for working at high altitude, so that the difficulty of sensor installation and the risk of personnel working at high altitude greatly increase, especially for the optical fiber grating sensor, the working at high altitude cannot provide a good working platform for optical fiber fusion;

4. Inapplicability for Long-Term Monitoring

Traditional sensors are greatly affected by environment, such as humidity, chemical corrosion, etc. Especially, the zero point of traditional resistive or vibrating wire sensors will drift for a long time, and the results of long-term strain test will be seriously distorted, which is not suitable for long-term monitoring.

Therefore, it is valuable to develop a long-term monitoring method for shield tunnel segments and optimize the installation and production process of sensors.

SUMMARY

In view of the problems existing in the prior art, the present invention provides an integrated manufacturing system and method for a small-deformation self-diagnosis shield segment.

The present invention is implemented as an integrated manufacturing system for a small-deformation self-diagnosis shield segment comprising:

shield segments, each of the shield segments comprising a concrete segment and a reinforcement framework;

an inclination monitoring module configured to monitor an inclination changing situation of a shield segment, wherein the inclination monitoring module comprises an optical fiber grating inclinometer, a inclinometer installing pre-cast box and a inclinometer installing device; when installing, the inclinometer is installed and a pre-cast box is welded at the bottom of a concave surface of a reinforcement cage in close proximity to a template, and is poured together with concrete; after the pouring is completed, a inclinometer installing pre-cast box is opened and then a push plate is loaded into an inclinometer installing device, wherein the inclinometer installing device is used for installing an optical fiber grating inclinometer self-provided with temperature compensation;

a displacement monitoring module configured to monitor a displacement changing situation among shield segments, wherein the displacement monitoring module comprises a first displacement meter installing pre-cast box, a second displacement meter installing pre-cast box, a first optical fiber grating displacement meter and a second optical fiber grating displacement meter; when installing, the first displacement meter installing pre-cast box and the second displacement meter installing pre-cast box are installed at positions near two side edges of the concave surface of the reinforcement cage, and then the first optical fiber grating displacement meter and the second optical fiber grating displacement meter are respectively placed in the first displacement meter installing pre-cast box and the second displacement meter installing pre-cast box; tail fibers of the first optical fiber grating displacement meter and the second optical fiber grating displacement meter at one end are connected in series inside the reinforcement cage, and a connecting line is protected and bound on a reinforcement by a fiber protective sleeve; the tail fibers at the other ends of the first optical fiber grating displacement meter and the second optical fiber grating displacement meter are introduced into the inclinometer installing pre-cast box, and the first optical fiber grating displacement meter and the second optical fiber grating displacement meter are both self-provided with temperature compensation;

a strain monitoring module configured to monitor a strain changing situation of the reinforced concrete of the shield segment, wherein the strain monitoring module comprises a first optical fiber grating strain gauge and a second optical fiber grating strain gauge; when installing, the first optical fiber grating strain gauge and the second optical fiber grating strain gauge are bound at a position of a main reinforcement of the reinforcement, one end tail fiber of the first optical fiber grating strain gauge and the second optical fiber grating strain gauge are connected in series inside the reinforcement cage, and the connecting line is protected and bound on the reinforcement by a fiber protective sleeve; the tail fibers at the other ends of the first optical fiber grating strain gauge and the second optical fiber grating strain gauge are introduced into an inclinometer installing pre-cast box, and both the first optical fiber grating strain gauge and the second optical fiber grating strain gauge are self-provided with temperature compensation;

a pressure monitoring module configured to monitor water and concrete pressure changes in the shield segment, wherein the pressure monitoring module comprises an optical fiber grating concrete pressure gauge, wherein the optical fiber grating concrete pressure gauge is installed at the right center of the convex surface of the reinforcement cage and is 3 mm higher than the uppermost reinforcement of the reinforcement cage; tail fibers at both ends of the optical fiber grating concrete pressure gauge are introduced into an inclinometer installing pre-cast box, and the optical fiber grating concrete pressure gauge is self-provided with temperature compensation;

a temperature compensation module, wherein a temperature compensation grating is provided inside the optical fiber grating sensor, and the wavelength difference between the optical fiber grating sensor and the force measurement spring grating is not less than 4 nm;

wherein all the tail fibers introduced into both ends of the inclinometer installing pre-cast box form an open-ended U-shaped optical cable bundle in the inclinometer installing pre-cast box; all optical fiber grating sensor tail fibers are connected in series inside the segment, and an optical fiber line is protected by a fiber protective sleeve, wherein the sleeve is bound on a reinforcement, and optical cables all surround the reinforcement framework; after the concrete pouring is completed and the segment is integrated, six optical cable ends are installed inside the inclinometer installing pre-cast box, and the whole line is in a shape of three Us, which corresponds to the displacement detection module, the strain monitoring module and the pressure monitoring module, respectively, to form an open-ended U-shaped optical cable bundle.

Further, the inclinometer installing device is rectangular with a face opened, and is placed at the bottom of a concave surface of a reinforcement cage in close proximity to a template, a cable port is provided on a face opposite to the face, the optical fiber tail after all the sensors are connected in series thereby enters the inclinometer protective device, and then the cable port is sealed with a waterproof adhesive tape; finally, a cover of the inclinometer installing device with a face opened is tightened with a screw for pouring, and the opened face of the inclinometer installing device and the concave surface of the shield segment remain horizontal after pouring is completed.

When the structure changes, the wavelength drift of the optical fiber grating is caused, and a specific monitoring module is determined according to a wavelength range to process data and upload same to a database to obtain change data reflecting the inclination, displacement, strain and water and concrete pressure of the shield tunnel; the data processing center further comprises an angle, displacement, strain and water and concrete pressure prompt unit for determining whether the changing situation data exceeds a change threshold value, and in the case where the determined result is yes, a prompt that there is a danger is provided.

The database is displayed on a client, and is displayed according to the indication information input by the user.

Further, all the tail fibers introduced into both ends of the inclinometer installing pre-cast box form an open-ended U-shaped optical cable bundle in the inclinometer installing pre-cast box; all optical fiber grating sensor tail fibers are connected in series inside the segment, and an optical fiber line is protected by a fiber protective sleeve, wherein the sleeve is bound on a reinforcement, and optical cables all surround the reinforcement framework; after the concrete pouring is completed and the segment is integrated, six optical cable ends are installed inside the inclinometer installing pre-cast box, and the whole line is in a shape of three Us, which corresponds to the displacement detection module, the strain monitoring module and the pressure monitoring module, respectively, to form an open-ended U-shaped optical cable bundle.

Further, after the segment maintenance and assembly is completed, the cover of the inclinometer installing pre-cast box is opened, and the inclinometer installing device is used to perform fine adjustment of the initial installation angle, so that the inclinometer sensor is vertical, and the initial angle is zero scale, and after the adjustment is completed, the inclinometer installing device is installed using a push plate.

Further, after the installation of the optical fiber grating inclinometer is completed, data of six optical fiber cables is detected, and the open ends of the U-shaped optical fiber cable bundles in the inclinometer installing pre-cast box are connected in series with each other, and then connected in series with the optical fiber grating inclinometer, and finally there are only two optical fiber interfaces; any optical fiber signal is connected to the optical information acquisition instrument, and the water and concrete pressure, stress and strain, temperature, displacement among segments and the change amount of the inclination of the segment itself in the segment are measured to form the integration of the whole deformation self-diagnosis shield segment.

Further, after the segment maintenance and assembly is completed, a cover of the pre-cast protective box installed on the first displacement meter and a cover of the pre-cast protective box installed on the second displacement meter is opened, and one end of the Z-shaped pull rod is connected to a telescopic rod of the displacement sensor via a threaded connecting cylinder; the threaded connecting cylinder is internally threaded, a shallow groove is opened at the parallel position of adjacent shield segments, and the other end of the Z-shaped pull rod is fixed in the shallow groove to achieve crack monitoring among segments.

All the sensing elements and installing elements are built in the shield segment, and are not higher than the concave plane of the shield segment; all the sensing elements and installing elements are installed in the process of shield segment pre-manufacture and maintenance.

Another object of the present invention is to provide an integrated manufacturing method for a small-deformation self-diagnosis shield segment implementing the integrated manufacturing system for a small-deformation self-diagnosis shield segment, the integrated manufacturing method for a small-deformation self-diagnosis shield segment comprising the following steps:

Step 1: monitoring an inclination changing situation of a shield segment using an inclination monitoring module, and monitoring a displacement changing situation among shield segments using a displacement monitoring module;

Step 2: monitoring a reinforced concrete strain changing situation of a shield segment using a strain monitoring module, and monitoring a water and concrete pressure change in the shield segment using a pressure monitoring module;

Step 3: performing temperature compensation using temperature compensation grating inside an optical fiber grating sensor via a temperature compensation module, and displaying a database at a user end according to the indication information input by a user.

Another object of the present invention is to provide a computer device comprising a memory and a processor, the memory storing a computer program which, when executed by the processor, causes the processor to carry out the steps of the integrated manufacturing method for the small-deformation self-diagnosis shield segment.

Another object of the present invention is to provide a computer-readable storage medium storing a computer program which, when executed by a processor, causes the processor to perform the steps of the integrated manufacturing method for the small-deformation self-diagnosis shield segment.

Another object of the present invention is to provide an information data processing terminal for implementing the integrated manufacturing system for a small-deformation self-diagnosis shield segment.

By combining the above-mentioned technical solution and the technical problem to be solved, the technical solution claimed by the present invention has the following advantages and positive effects:

firstly, with regard to the technical problem existing in the above-mentioned prior art and the difficulty of solving the problem, by closely combining the claimed technical solution of the present invention and the results and data in the development process, etc. the technical problem to be solved by the technical solution of the present invention is analyzed in detail and profoundly, and some inventive technical effects are brought about after the problem is solved. The detailed description is as follows:

the integrated manufacturing method for a small-deformation self-diagnosis shield segment according to the present invention have the following effects:

(1) after the installation is completed, all the sensors are inside the segment, and the surface of the shield segment is smooth, facilitating subsequent transportation, assembly, grouting and secondary pouring, and facilitating the protection of all the sensors from damage to greatly reduce the influence of the external environment on the sensors and ensure the normal operation of the sensors;

(2) the cables of all the sensors are located in a inclinometer installing pre-cast box to facilitate real-time detection of data after the installation is completed, and facilitate maintenance and repair of some sensors to improve the overall self-diagnosis efficiency;

(3) all sensors can be linked, installed and debugged in the segment maintenance stage before the segment pre-manufacture and installation, which greatly reduces the strength and time of working high above the ground later;

(4) all the optical fiber connections are hidden in the segment, avoiding the sucker suction position in the process of shield segment transportation and assembly, and the installation simplifies the optical fiber connection protective treatment without external joint treatment, greatly reducing the damage effect on the optical fiber line caused by the later tunnel construction;

(5) the built-in tilt angle sensor box cannot only flexibly solve the problems of verticality and external damage when the sensors are installed, but also play a role of taking into account the multiple sensors optical fiber connection hub, forming U-shaped serial connection of multiple sensors, which basically eliminates the occurrence of sensor failure caused by optical fiber interruption;

(6) the built-in displacement sensor not only solves the problem that the sensor can be easily damaged when provided externally, but also solves the problem of protecting the optical fiber.

Secondly, when regarding the technical solution as a whole or from the perspective of products, the technical effects and advantages of the claimed technical solution of the present invention are specifically described as follows:

the present invention provides an integrated manufacturing method for a small-deformation self-diagnosis shield segment, wherein each shield segment is taken as a monitored body all through the production, pouring and assembly of the shield segment; all sensors are bound on a reinforcement cage of the shield segment before the shield segment is not poured, and are connected in series in the reinforcement cage, and all monitored lines are collected in a reserved box; and after the pouring is completed, a cover plate of the reserved box is opened to check a line to complete the manufacturing of the self-diagnosis shield segment.

According to this technical solution, the conventional on-site installation of sensors and on-site connecting lines are converted into pre-fabricated integrated intelligent shield segments, which advances the process, increases the operability of installation work, the safety of construction operation and the convenience of maintenance and repair in the later period.

Thirdly, as auxiliary evidence for inventiveness of the claims of the present invention, it is also embodied in the following important aspects:

(1) the expected profit and commercial value after the conversion of the technical solution of the present invention are:

after the technical solution is converted, the conventional monitoring method will be changed, the monitoring of a physical quantity at a certain position of a building will be changed to the monitoring of the whole building structure, and the monitoring of a single physical quantity at a single point will be changed to the monitoring of the whole structure, and the work will be completed with shorter installation time and higher monitoring efficiency;

(2) whether the technical solution of the present invention solves the technical problem that people have been eager to solve, but have never succeeded:

after the technical solution is converted, the manufacturing and processing technology of the shield segment will be changed, and the manufacturing of the shield segment and the structure monitoring of the shield segment will be combined to form a new type of intelligent shield segment, and the new type of intelligent shield segment will have a monitoring function when leaving the site and will have a higher market competitiveness.

BRIEF DESCRIPTION OF DRAWINGS

In order to explain the embodiments of the present invention or the technical solutions in the prior art more clearly, a brief description will be given below of the drawings which need to be used in the embodiments of the present invention. It is obvious that the drawings in the following description are only some embodiments of the present invention, and it would have been obvious for a person skilled in the art to obtain other drawings according to these drawings without involving any inventive effort.

DETAILED DESCRIPTION OF THE EMBODIMENTS

In order that the objects, aspects and advantages of the present invention will become more apparent, a more particular description of the invention will be rendered by reference to specific embodiments thereof. It should be understood that the particular embodiments described herein are illustrative only and are not limiting.

In view of the problems existing in the prior art, the present invention provides an integrated manufacturing system and method for a small-deformation self-diagnosis shield segment, and will be described in detail with reference to the accompanying drawings.

According to an embodiment of the present invention, each monitored part in the shield segment is regarded as a module, which is respectively an inclination monitoring module, a displacement monitoring module, a strain monitoring module and a pressure monitoring module, wherein each monitoring module is configured as an optical fiber grating sensor self-provided with temperature compensation; two optical fibers are led out of each monitoring module, and both enter a pre-cast box to form a U-shaped optical cable bundle; after the manufacture of the segment is completed, a joint of each optical cable is detected, and the optical cables which have been detected to be intact are welded in series from end to end to form a complete U-shaped optical cable bundle; in addition, it needs to be stated that the wavelengths of all the optical fiber grating sensors are arranged at intervals, and the wavelength difference between each two sensors is greater than 3 nm; in actual monitoring, data can be collected at any head of the U-shaped optical cable bundle to obtain data of all the monitoring modules; when the structure changes, the wavelength drift of the optical fiber grating is caused, and a specific monitoring module is determined according to a wavelength range to process data and upload same to a database to obtain change data reflecting the inclination, displacement, strain and water and concrete pressure of the shield tunnel; the data processing center further comprises an angle, displacement, strain and water and concrete pressure prompt unit for determining whether the changing situation data exceeds a change threshold value, and in a case where the determined result is yes, a prompt that there is a danger is provided.

In order for a person skilled in the art to fully understand how the invention may be embodied, this section is an illustrative embodiment that expands on the claimed technical solution.

Figure 1:
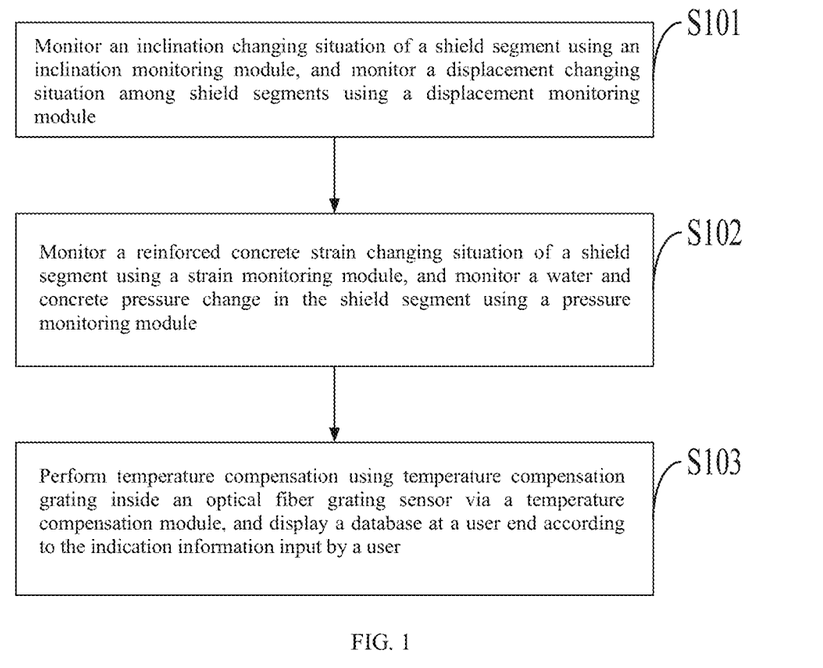
FIG. 1 is a flow chart showing an integrated manufacturing method for a small-deformation self-diagnosis shield segment according to an embodiment of the present invention.

As shown in FIG. 1, the integrated manufacturing method for a small-deformation self-diagnosis shield segment according to an embodiment of the present invention comprises the following steps:

S101: monitoring an inclination changing situation of a shield segment using an inclination monitoring module, and monitoring a displacement changing situation among shield segments using a displacement monitoring module;

S102: monitoring a reinforced concrete strain changing situation of a shield segment using a strain monitoring module, and monitoring a water and concrete pressure change in the shield segment using a pressure monitoring module; and S103: performing temperature compensation using temperature compensation grating inside an optical fiber grating sensor via a temperature compensation module, and displaying a database at a user end according to the indication information input by a user.

Figure 2:
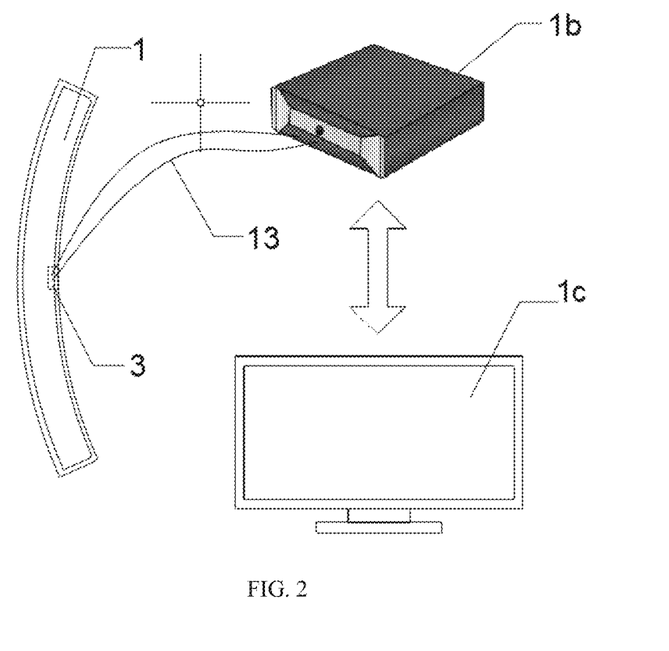
FIG. 2 is a schematic diagram showing a structure of a shield segment monitoring system according to an embodiment of the present invention.
Figure 4:
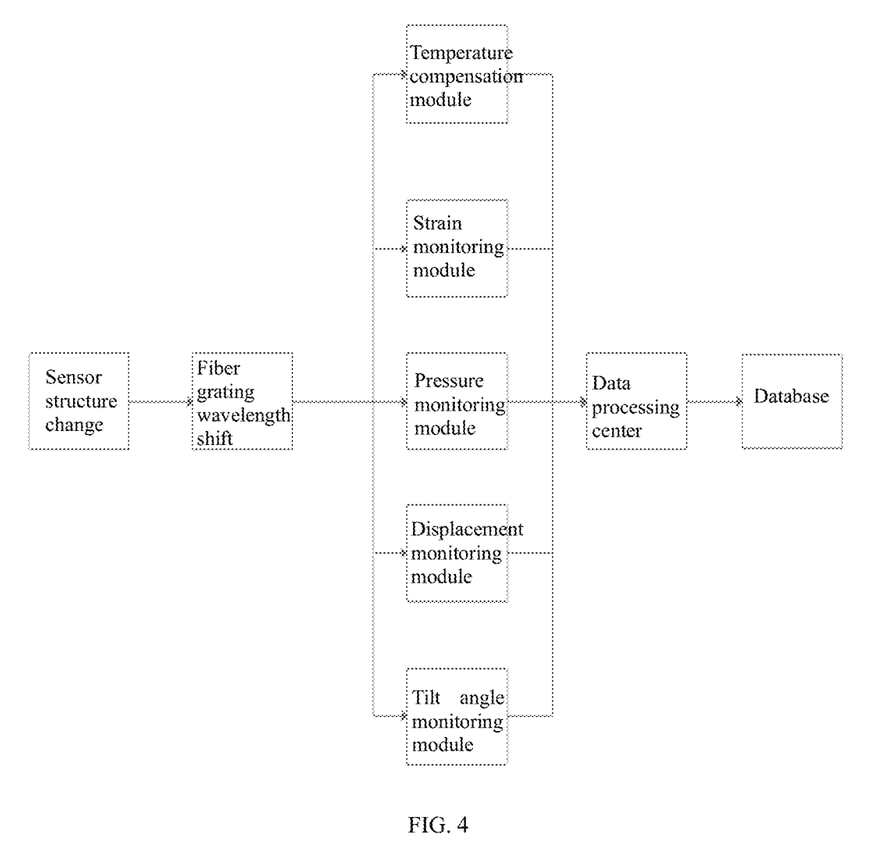
FIG. 4 is a flow diagram of an optical fiber monitoring system according to an embodiment of the present invention.

As shown in FIGS. 2 and 4, the small-deformation self-diagnosis shield segment according to an embodiment of the present invention includes: a concrete segment 1, an inclinometer installing pre-cast box 3, a signal transmission optical cable 13, a data processing center 1b and a user end 1c. When the structure changes, the wavelength drift of the optical fiber grating is caused, and a specific monitoring module is determined according to a wavelength range to process data and upload same to a database to obtain change data reflecting the inclination, displacement, strain and water and concrete pressure of the shield tunnel; the data processing center 1b further comprises an angle, displacement, strain and water and concrete pressure prompt unit for determining whether the changing situation data exceeds a change threshold value, and in the case where the determined result is yes, a prompt that there is a danger is provided.

The database is displayed on a client 1c, and is displayed according to the indication information input by the user.

Figure 3:
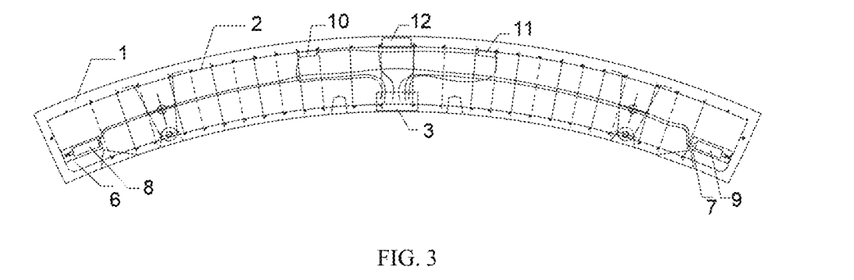
FIG. 3 is a structural diagram of a layout route of a rib sensor in a shield segment according to an embodiment of the present invention.

As shown in FIG. 3, the small-deformation self-diagnosis shield segment according to an embodiment of the present invention comprises: a concrete segment 1 and a reinforcement framework 2.

An inclination monitoring module is configured to monitor the inclination change of the shield segment, which comprises: an optical fiber grating inclinometer 5, an inclinometer installing pre-cast box 3, and an inclinometer installing device 4. When installing, an inclinometer installing pre-cast box 3 is welded at the bottom of the concave surface of the reinforcement framework 2 close to the formwork, and poured together with the concrete. After the pouring is completed, an inclinometer installing pre-cast box 3 is opened, and then an inclinometer installing device 4 is installed by using a push plate, wherein the inclinometer installing device 4 is used for installing an optical fiber grating inclinometer 5 self-provided with temperature compensation.

A displacement monitoring module is configured to monitor the displacement change among shield segments, which comprises: a first displacement meter installing pre-cast box 6, a second displacement meter installing pre-cast box 7, a first optical fiber grating displacement meter 8 and a second optical fiber grating displacement meter 9. When installing, a first displacement meter installing pre-cast box 6 and a second displacement meter installing pre-cast box 7 are installed on a concave surface of the reinforcement framework 2 at the positions of two side edges, then a first optical fiber grating displacement meter 8 and a second optical fiber grating displacement meter 9 are respectively placed into the first displacement meter installing pre-cast box 6 and the second displacement meter installing pre-cast box 7, tail fibers of the first optical fiber grating displacement meter 8 and the second optical fiber grating displacement meter 9 on one end are connected in series inside the reinforcement cage, and the connecting line is protected and bound on the reinforcement by a fiber protective sleeve, the tail fibers of the first optical fiber grating displacement meter 8 and the second optical fiber grating displacement meter 9 on the other end are introduced into the inclinometer installing pre-cast box 3, and the first optical fiber grating displacement meter 8 and the second optical fiber grating displacement meter 9 are both self-provided with temperature compensation.

A strain monitoring module configured to monitor a reinforced concrete strain changing situation of a shield segment, comprising: a first fiber grating strain gauge 10 and a second fiber grating strain gauge 11. When installing, the first optical fiber grating strain gauge 10 and the second optical fiber grating strain gauge 11 are bound at a position of a main reinforcement of the reinforcement, one end tail fiber of the first optical fiber grating strain gauge 10 and the second optical fiber grating strain gauge 11 are connected in series inside the reinforcement cage, and the connecting line is protected and bound on the reinforcement by a fiber protective sleeve; the tail fibers at the other ends of the first optical fiber grating strain gauge 10 and the second optical fiber grating strain gauge 11 are introduced into an inclinometer installing pre-cast box 3, and both the first optical fiber grating strain gauge 10 and the second optical fiber grating strain gauge 11 are self-provided with temperature compensation.

A pressure monitoring module configured to monitor water and concrete pressure changes in the shield segment, wherein the pressure monitoring module comprises an optical fiber grating concrete pressure gauge 12, wherein the optical fiber grating concrete pressure gauge 12 is installed at the right center of the convex surface of the reinforcement cage 2 and is 3 mm higher than the uppermost reinforcement of the reinforcement cage 2; tail fibers at both ends of the optical fiber grating concrete pressure gauge 12 are introduced into an inclinometer installing pre-cast box 3, and the optical fiber grating concrete pressure gauge 12 is self-provided with temperature compensation.

A temperature compensation module, wherein a temperature compensation grating is provided inside the optical fiber grating sensor, and the wavelength difference between the optical fiber grating sensor and the force measurement spring grating is not less than 4 nm. All the tail fibers introduced into both ends of the inclinometer installing pre-cast box form an open-ended U-shaped optical cable bundle in the inclinometer installing pre-cast box; all optical fiber grating sensor tail fibers are connected in series inside the segment, and an optical fiber line is protected by a fiber protective sleeve, wherein the sleeve is bound on a reinforcement, and optical cables all surround the reinforcement framework; after the concrete pouring is completed and the segment is integrated, six optical cable ends are installed inside the inclinometer installing pre-cast box, and the whole line is in a shape of three Us, which corresponds to the displacement detection module, the strain monitoring module and the pressure monitoring module, respectively, to form an open-ended U-shaped optical cable bundle.

Figure 5:
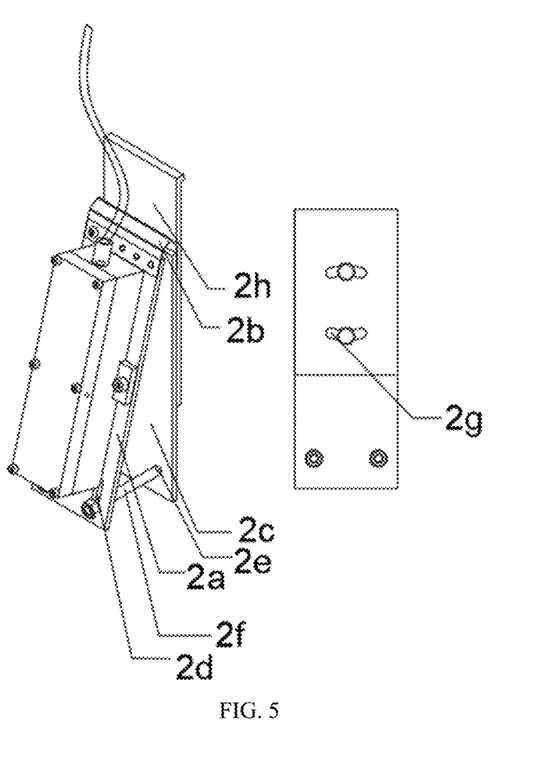
FIG. 5 is a schematic diagram showing an operation of an inclinometer installing device in an inclination monitoring module according to an embodiment of the present invention.

As shown in FIG. 5, the inclinometer installing device 4 of the inclinometer monitoring module according to an embodiment of the present invention includes: a first movable plate 2a, an elastic connecting plate 2b, a second movable plate 2c, a strip-shaped hole 2d, a first circular hole 2e, a first bolt 2f, a C-shaped hole 2g, and a push plate 2h. The first movable plate 2a is detachably and fixedly connected to the optical fiber grating inclinometer 5 via a screw; an elastic connecting plate 2b is fixedly mounted on one end of the first movable plate 2a; the elastic connecting plate 2b can be an elastic stainless steel plate product; a second movable plate 2c is fixedly mounted on one end of the elastic connecting plate 2b away from the first movable plate 2a; a strip-shaped hole 2d is provided on the side of the first movable plate 2a away from the elastic connecting plate 2b, and a first circular through hole 2e is provided on the side of the second movable plate 2c away from the elastic connecting plate 2b; a first bolt 2f penetrating through the strip-shaped hole 2d and extending to one side of the first movable plate 2a away from the second movable plate 2c is movably mounted in the first circular through hole 2e, and a C-shaped hole 2g is provided on the push plate 2h; the elastic potential energy of the elastic connecting plate 2b enables the first movable plate 2a and the second movable plate 2c to have a certain elastic opening force in the closed state, so that the opposite sides of the first movable plate 2a and the second movable plate 2c both exert an elastic force on the first bolt 2f and limit same, and the opening and closing angle between the first movable plate 2a and the second movable plate 2c is adjusted by adjusting the position between the nut and the screw on the first bolt 2f, i.e., an angle between the optical fiber grating inclinometer 5 on the first movable plate 2a and the second movable plate 2c is preliminarily adjusted; and then the position of the C-shaped hole 2G on the push plate 9 is adjusted, and a relative angle between the optical fiber grating inclinometer 5 and the push plate 2h is further adjusted along a joint plane of the second movable plate 2c and the push plate 2h to avoid the situation that the collected data is inaccurate due to the installation angle of the optical fiber grating inclinometer 5 being unable to be adjusted, achieving the effects of simple and convenient multi-angle adjustment and high-precision detection.

Figure 6:
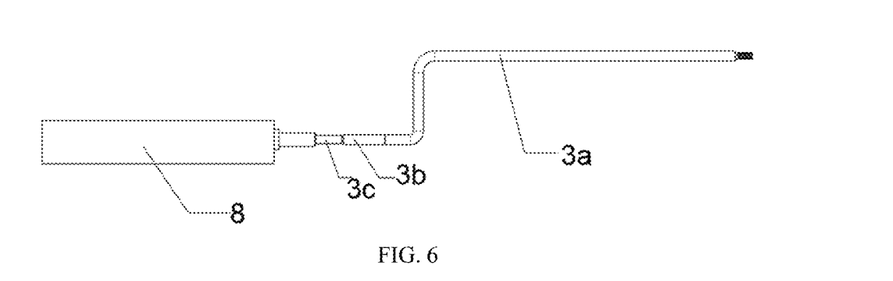
FIG. 6 is an operational schematic diagram showing a displacement monitoring module according to an embodiment of the present invention.

As shown in FIG. 6, in the embodiment of the present invention, after the segment maintenance and assembly is completed, a cover of the pre-cast protective box 6 installed on the first displacement meter and a cover of the pre-cast protective box installed on the second displacement meter 7 is opened, and one end of the Z-shaped pull rod 3a is connected to a telescopic rod 3c of the displacement sensor via a threaded connecting cylinder 3b; the threaded connecting cylinder 3b is internally threaded, a shallow groove is opened at the parallel position of adjacent shield segments, and the other end of the Z-shaped pull rod 3a is fixed in the shallow groove to achieve crack monitoring among segments.

Figure 7:
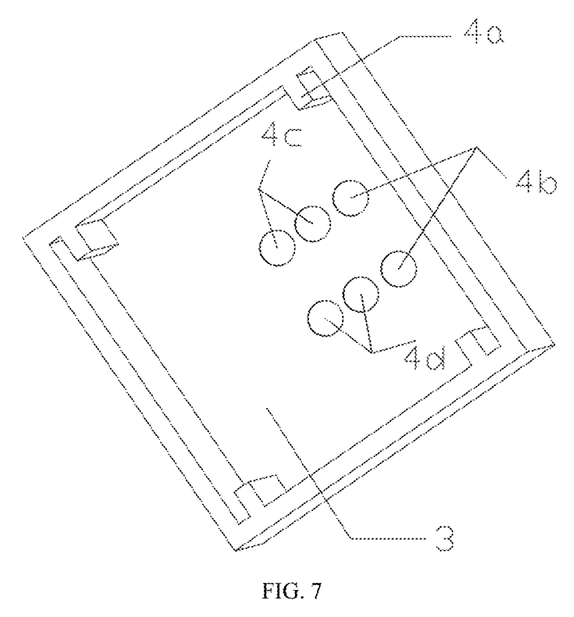
FIG. 7 is a block diagram of an inclinometer installing pre-cast box in an inclination monitoring module according to an embodiment of the present invention.

As shown in FIG. 7, the inclinometer installing pre-cast box 3 provided in the embodiment of the present invention is a rectangular parallelepiped, one face of which can be opened, and the pre-cast box is placed on the bottom of the concave surface of the reinforcement framework 2 in a position closely adjacent to the template; a cable port is provided on the opposite face of the face, respectively corresponding to a displacement monitoring module tail fiber 4b, a strain monitoring module tail fiber 4c and a pressure monitoring module tail fiber 4d; the optical fiber tail fibers after all the sensors are connected in series thus enter the inclinometer protective device, and then the cable port is sealed with a waterproof adhesive tape to prevent the entry of concrete slurry. When pouring, the cover of the opening face of the installing pre-cast box 3 of the inclinometer is screwed tightly and then pouring is started, and the opening face of the installing pre-cast box 3 of the inclinometer and the concave face of the shield segment remain horizontal after pouring is completed. After the segment maintenance and assembly is completed, the cover of the inclinometer installing pre-cast box 3 is opened, and in consideration of a slight change in the position of the segment during the assembly process, the inclinometer installing device 4 is used to perform fine adjustment of the initial installation angle, so that the optical fiber grating inclinometer 5 is vertical, and the initial angle is zero scale; after the adjustment is completed, the push plate 3h is loaded into the inclinometer installing device 4 via the push plate clamping groove 4a, and pushed to the end of the inclinometer installing pre-cast box 3 and fixed with a screw.

As shown in FIGS. 2 and 3, after the installation of the optical fiber grating inclinometer 5 is completed, data of six optical fiber cables is detected, and the open ends of the U-shaped optical fiber cable bundles in the inclinometer installing pre-cast box are connected in series with each other, and then connected in series with the optical fiber grating inclinometer 5, and finally there are only two optical fiber interfaces; any optical fiber signal is connected to the optical information acquisition instrument, and the water and concrete pressure, stress and strain, temperature, displacement among segments and the change amount of the inclination of the segment itself in the segment are measured to form the integration of the whole deformation self-diagnosis shield segment.

II. Application Examples. In order to prove the inventiveness and technical value of the technical solution of the present invention, this part is an application example of the technical solution of the claims on specific products or related technologies.

III. Evidence of the effects associated with the Examples. The embodiment of the invention has some positive effects in the process of research and development or use, and indeed has great advantages compared with the prior art, and the following contents are described by combining data, charts and the like in the test process.

It should be noted that embodiments of the present invention may be implemented in hardware, software, or a combination of hardware and software. The hardware part may be implemented using dedicated logic; the software component may be stored in a memory and executed by a suitable instruction execution system, such as a microprocessor or dedicated design hardware. A person skilled in the art will appreciate that the device and methods described above may be implemented using computer-executable instructions and/or embodied in processor control code, for example, provided on a carrier medium such as a disk, CD or DVD-ROM, programmable memory such as read-only memory (firmware), or a data carrier such as an optical or electronic signal carrier. The device and modules thereof of the present invention may be implemented by hardware circuits such as very large scale integrated circuits or gate arrays, semiconductors such as logic chips, transistors, etc. or programmable hardware devices such as field programmable gate arrays, programmable logic devices, etc. by software executed by various types of processors, or by a combination of the above hardware circuits and software, e.g. firmware.

Although the preferred embodiments of the present invention have been disclosed for illustrative purposes, a person skilled in the art will appreciate that various modifications, additions and substitutions are possible, without departing from the scope and spirit of the invention as disclosed in the accompanying claims.

What is claimed is:

1. An integrated manufacturing system for a small-deformation self-diagnosis shield segment, comprising an inclination monitoring module, a displacement monitoring module, a strain monitoring module and a pressure monitoring module; wherein each monitoring module is configured as an optical fiber grating sensor self-provided with temperature compensation; two optical fibers are led out of each monitoring module, and both enter a pre-cast box to form a U-shaped optical cable bundle; after the manufacture of the segment is completed, a joint of each optical cable is detected, and the optical cables which have been detected to be intact are welded in series from end to end to form a complete U-shaped optical cable bundle;

the wavelengths of all the optical fiber grating sensors are arranged at intervals, and the wavelength difference between each two sensors is greater than 3 nm; in practical monitoring, data can be collected at any head of the U-shaped optical cable bundle to obtain data of all the monitoring modules; when the structure changes, the wavelength drift of the optical fiber grating is caused, and a specific monitoring module is determined according to a wavelength range to process data and upload same to a database to obtain change data reflecting the inclination, displacement, strain and water and concrete pressure of the shield tunnel; the data processing center further comprises an angle, displacement, strain and water and concrete pressure prompt unit for determining whether the changing situation data exceeds a change threshold value, and in the case where the determined result is yes, a prompt that there is a danger is provided.

2. The integrated manufacturing system for a small-deformation self-diagnosis shield segment according to claim 1, wherein the integrated manufacturing system for a small-deformation self-diagnosis shield segment comprises:

shield segments, each of the shield segments comprising a concrete segment and a reinforcement framework;

an inclination monitoring module configured to monitor an inclination changing situation of a shield segment, wherein the inclination monitoring module comprises an optical fiber grating inclinometer, a inclinometer installing pre-cast box and a inclinometer installing device; when installing, the inclinometer is installed and a pre-cast box is welded at the bottom of a concave surface of a reinforcement cage in close proximity to a template, and is poured together with concrete; after the pouring is completed, a inclinometer installing pre-cast box is opened and then a push plate is loaded into an inclinometer installing device, wherein the inclinometer installing device is used for installing an optical fiber grating inclinometer self-provided with temperature compensation;

a displacement monitoring module configured to monitor a displacement changing situation among shield segments, wherein the displacement monitoring module comprises a first displacement meter installing pre-cast box, a second displacement meter installing pre-cast box, a first optical fiber grating displacement meter and a second optical fiber grating displacement meter; when installing, the first displacement meter installing pre-cast box and the second displacement meter installing pre-cast box are installed at positions near two side edges of the concave surface of the reinforcement cage, and then the first optical fiber grating displacement meter and the second optical fiber grating displacement meter are respectively placed in the first displacement meter installing pre-cast box and the second displacement meter installing pre-cast box; tail fibers of the first optical fiber grating displacement meter and the second optical fiber grating displacement meter at one end are connected in series inside the reinforcement cage, and a connecting line is protected and bound on a reinforcement by a fiber protective sleeve; the tail fibers at the other ends of the first optical fiber grating displacement meter and the second optical fiber grating displacement meter are introduced into the inclinometer installing pre-cast box, and the first optical fiber grating displacement meter and the second optical fiber grating displacement meter are both self-provided with temperature compensation;

a strain monitoring module configured to monitor a strain changing situation of the reinforced concrete of the shield segment, wherein the strain monitoring module comprises a first optical fiber grating strain gauge and a second optical fiber grating strain gauge; when installing, the first optical fiber grating strain gauge and the second optical fiber grating strain gauge are bound at a position of a main reinforcement of the reinforcement, one end tail fiber of the first optical fiber grating strain gauge and the second optical fiber grating strain gauge are connected in series inside the reinforcement cage, and the connecting line is protected and bound on the reinforcement by a fiber protective sleeve; the tail fibers at the other ends of the first optical fiber grating strain gauge and the second optical fiber grating strain gauge are introduced into an inclinometer installing pre-cast box, and both the first optical fiber grating strain gauge and the second optical fiber grating strain gauge are self-provided with temperature compensation;

a pressure monitoring module configured to monitor water and concrete pressure changes in the shield segment, wherein the pressure monitoring module comprises an optical fiber grating concrete pressure gauge, wherein the optical fiber grating concrete pressure gauge is installed at the right center of the convex surface of the reinforcement cage and is 3 mm higher than the uppermost reinforcement of the reinforcement cage; tail fibers at both ends of the optical fiber grating concrete pressure gauge are introduced into an inclinometer installing pre-cast box, and the optical fiber grating concrete pressure gauge is self-provided with temperature compensation;

a temperature compensation module, wherein a temperature compensation grating is provided inside the optical fiber grating sensor, and the wavelength difference between the optical fiber grating sensor and the force measurement spring grating is not less than 4 nm;

wherein all the tail fibers introduced into both ends of the inclinometer installing pre-cast box form an open-ended U-shaped optical cable bundle in the inclinometer installing pre-cast box; all optical fiber grating sensor tail fibers are connected in series inside the segment, and an optical fiber line is protected by a fiber protective sleeve, wherein the sleeve is bound on a reinforcement, and optical cables all surround the reinforcement framework; after the concrete pouring is completed and the segment is integrated, six optical cable ends are installed inside the inclinometer installing pre-cast box, and the whole line is in a shape of three Us, which corresponds to the displacement detection module, the strain monitoring module and the pressure monitoring module, respectively, to form an open-ended U-shaped optical cable bundle.

3. The integrated manufacturing system for a small-deformation self-diagnosis shield segment according to claim 2, wherein the inclinometer installing device is rectangular with a face opened, and is placed at the bottom of a concave surface of a reinforcement cage in close proximity to a template, a cable port is provided on a face opposite to the face, the optical fiber tail after all the sensors are connected in series thereby enters the inclinometer protective device, and then the cable port is sealed with a waterproof adhesive tape; finally, a cover of the inclinometer installing device with a face opened is tightened with a screw for pouring, and the opened face of the inclinometer installing device and the concave surface of the shield segment remain horizontal after pouring is completed;

when the structure changes, the wavelength drift of the optical fiber grating is caused, and a specific monitoring module is determined according to a wavelength range to process data and upload same to a database to obtain change data reflecting the inclination, displacement, strain and water and concrete pressure of the shield tunnel; the data processing center further comprises an angle, displacement, strain and water and concrete pressure prompt unit for determining whether the changing situation data exceeds a change threshold value, and in the case where the determined result is yes, a prompt that there is a danger is provided;

the database is displayed on a client, and is displayed according to the indication information input by the user.

4. The integrated manufacturing system for a small-deformation self-diagnosis shield segment according to claim 2, wherein all optical fiber grating sensor tail fibers are connected in series inside the segment, and an optical fiber line is protected by a fiber protective sleeve, wherein the sleeve is bound on a reinforcement, and optical cables all surround the reinforcement framework; after the concrete pouring is completed and the segment is integrated, six optical cable ends are installed inside the inclinometer installing pre-cast box, and the whole line is in a shape of three Us, which corresponds to the displacement detection module, the strain monitoring module and the pressure monitoring module, respectively, to form an open-ended U-shaped optical cable bundle;

after the segment maintenance and assembly is completed, the cover of the inclinometer installing pre-cast box is opened, and the inclinometer installing device is used to perform fine adjustment of the initial installation angle, so that the inclinometer sensor is vertical, and the initial angle is zero scale, and after the adjustment is completed, the inclinometer installing device is installed using a push plate.

5. The integrated manufacturing system for a small-deformation self-diagnosis shield segment according to claim 1, wherein after the installation of the optical fiber grating inclinometer is completed, data of six optical fiber cables is detected, and the open ends of the U-shaped optical fiber cable bundles in the inclinometer installing pre-cast box are connected in series with each other, and then connected in series with the optical fiber grating inclinometer, and finally there are only two optical fiber interfaces; any optical fiber signal is connected to the optical information acquisition instrument, and the water and concrete pressure, stress and strain, temperature, displacement among segments and the change amount of the inclination of the segment itself in the segment are measured to form the integration of the whole deformation self-diagnosis shield segment;

after the segment maintenance and assembly is completed, a cover of the pre-cast protective box installed on the first displacement meter and a cover of the pre-cast protective box installed on the second displacement meter is opened, and one end of the Z-shaped pull rod is connected to a telescopic rod of the displacement sensor via a threaded connecting cylinder; the threaded connecting cylinder is internally threaded, a shallow groove is opened at the parallel position of adjacent shield segments, and the other end of the Z-shaped pull rod is fixed in the shallow groove to achieve crack monitoring among segments;

all the sensing elements and installing elements are built in the shield segment, and are not higher than the concave plane of the shield segment; all the sensing elements and installing elements are installed in the process of shield segment pre-manufacture and maintenance.

6. The integrated manufacturing method for the small-deformation self-diagnosis shield segment implementing the integrated manufacturing system for the small-deformation self-diagnosis shield segment according to claim 1, wherein the integrated manufacturing method for the small-deformation self-diagnosis shield segment comprises the following steps:

Step 1: monitoring an inclination changing situation of the shield segment using the inclination monitoring module, and monitoring a displacement changing situation among shield segments using the displacement monitoring module;

Step 2: monitoring a reinforced concrete strain changing situation of the shield segment using the strain monitoring module, and monitoring a water and concrete pressure change in the shield segment using the pressure monitoring module; and Step 3: performing temperature compensation using temperature compensation grating inside the optical fiber grating sensor via the temperature compensation module, and displaying the database at a user end according to the indication information input by the user.

7. A computer device, comprising a memory and a processor, the memory storing a computer program which, when executed by the processor, causes the processor to carry out the steps of the integrated method for the manufacturing small-deformation self-diagnostic shield segments according to claim 6.

8. A computer readable storage medium, wherein the computer readable storage medium stores a computer program which, when executed by a processor, causes the processor to carry out the steps of the integrated method for manufacturing the small-deformation self-diagnostic shield segment according to claim 6.

9. An information data processing terminal, wherein the information data processing terminal is used for carrying out the steps of the integrated manufacturing method for the small-deformation self-diagnosis shield segment according to claim 6.

* * * * *